United States Patent
Koyama et al.

(10) Patent No.: US 10,495,741 B2
(45) Date of Patent: Dec. 3, 2019

(54) OBJECT DETECTION DEVICE AND OBJECT DETECTION SYSTEM

(71) Applicant: DENSO CORPORATION, Kariya, Aichi-pref. (JP)

(72) Inventors: Yu Koyama, Kariya (JP); Tetsuya Aoyama, Kariya (JP); Taketo Harada, Nisshin (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/781,589

(22) PCT Filed: Nov. 30, 2016

(86) PCT No.: PCT/JP2016/085476
§ 371 (c)(1),
(2) Date: Jun. 5, 2018

(87) PCT Pub. No.: WO2017/098971
PCT Pub. Date: Jun. 15, 2017

(65) Prior Publication Data
US 2019/0302248 A1 Oct. 3, 2019

(30) Foreign Application Priority Data
Dec. 7, 2015 (JP) ................................ 2015-238776

(51) Int. Cl.
*G01S 7/524* (2006.01)
*G01S 15/04* (2006.01)

(52) U.S. Cl.
CPC .............. *G01S 7/524* (2013.01); *G01S 15/04* (2013.01)

(58) Field of Classification Search
None
See application file for complete search history.

(56) References Cited

U.S. PATENT DOCUMENTS 6,922,147 B1 * 7/2005 Viksnins ................ B60N 2/002
340/573.1
6,950,054 B1 * 9/2005 Steinway ................ G01S 7/412
342/173
8,918,006 B2 * 12/2014 Oyoshi .............. G03G 15/5004
399/79

(Continued)

FOREIGN PATENT DOCUMENTS

JP  S63-081288 A  4/1988
JP  2015-090268 A  5/2015

*Primary Examiner* — Fekadeselassie Girma
(74) *Attorney, Agent, or Firm* — Knobbe, Martens, Olson & Bear, LLP (57) ABSTRACT

An object detection device is applied to an object detection system configured such that connection to a control device is made via a communication line to perform power supply via the communication line and a signal is superimposed on current flowing through the communication line to transfer information. The object detection device is configured to drive a piezoelectric vibrator in a predetermined control period and transmit a survey wave and receive a wave reflected by an object. The object detection device includes a capacitor connected in parallel with a driver circuit configured to drive the piezoelectric vibrator, and a current control unit configured to control the current value of the communication line after the end of supplying power to the driver circuit.

8 Claims, 9 Drawing Sheets

(56) References Cited

U.S. PATENT DOCUMENTS

| | | | | |
|---|---|---|---|---|
| 9,280,649 | B2* | 3/2016 | Matsuda | G06K 9/00362 |
| 9,836,069 | B1* | 12/2017 | Nelmes | G05B 15/02 |
| 10,102,729 | B1* | 10/2018 | Hill | G08B 21/24 |
| 10,115,029 | B1* | 10/2018 | Day | G06K 9/00832 |
| 2002/0140215 | A1* | 10/2002 | Breed | B60N 2/853 280/735 |
| 2003/0098792 | A1* | 5/2003 | Edwards | B60N 2/002 340/573.1 |
| 2004/0082342 | A1* | 4/2004 | Toguchi | G01S 7/4004 455/456.1 |
| 2005/0038582 | A1* | 2/2005 | Arndt | B60H 1/008 701/31.4 |
| 2006/0184297 | A1* | 8/2006 | Higgins-Luthman | B60R 1/00 701/41 |
| 2007/0013531 | A1* | 1/2007 | Hules | B60R 25/1004 340/584 |
| 2010/0245066 | A1 | 9/2010 | Sarioglu et al. | |
| 2013/0127479 | A1* | 5/2013 | Grills | G01B 7/14 324/684 |
| 2013/0249395 | A1* | 9/2013 | Hatakeyama | B60K 35/00 315/77 |
| 2014/0193034 | A1* | 7/2014 | Oami | G06K 9/00362 382/103 |
| 2014/0233796 | A1* | 8/2014 | Tanaka | G06T 7/194 382/103 |
| 2014/0253363 | A1* | 9/2014 | Kajiki | G01S 13/536 342/28 |
| 2015/0032288 | A1* | 1/2015 | Huth | G08G 1/165 701/1 |
| 2015/0309168 | A1* | 10/2015 | Mizutani | G01S 13/931 342/27 |
| 2016/0200168 | A1* | 7/2016 | Boyer | H04R 19/04 701/45 |
| 2016/0245914 | A1 | 8/2016 | Nomura et al. | |
| 2016/0249815 | A1* | 9/2016 | Freeman | H04W 4/029 600/483 |
| 2017/0030135 | A1* | 2/2017 | Elie | E05F 15/41 |
| 2017/0036512 | A1* | 2/2017 | Willard, Jr. | B60H 1/00892 |
| 2017/0088044 | A1* | 3/2017 | Hensley | B60Q 5/005 |
| 2017/0240022 | A1* | 8/2017 | Ireri | B60N 2/26 |
| 2017/0242122 | A1* | 8/2017 | Suzuki | B62D 15/029 |
| 2017/0282822 | A1* | 10/2017 | Hunter, Jr. | B60K 35/00 |
| 2018/0065504 | A1* | 3/2018 | Lan | B60N 2/002 |
| 2018/0170213 | A1* | 6/2018 | Lu-Dac | A61B 5/0507 |
| 2018/0261069 | A1* | 9/2018 | Honey-Jones | G08B 13/19697 |
| 2018/0281709 | A1* | 10/2018 | Mendez | B60N 2/002 |
| 2018/0370431 | A1* | 12/2018 | Wincek | G01V 3/088 |
| 2019/0212443 | A1* | 7/2019 | Nomura | G01S 15/93 |

* cited by examiner

OBJECT DETECTION DEVICE AND OBJECT DETECTION SYSTEM

CROSS-REFERENCE TO RELATED APPLICATION

This application is a national stage application under 35 USC § 371(c) of PCT Application No. PCT/JP2016/085476, filed on Nov. 30, 2016, which is based on and claims the benefit of priority from earlier Japanese Patent Application No. 2015-238776, filed on Dec. 7, 2015, the disclosures of which is incorporated herein by reference.

TECHNICAL FIELD

The present disclosure relates to an object detection technique for transmitting survey waves and receive waves reflected by an object.

BACKGROUND ART

Patent Literature 1 describes an object detection device configured to transmit survey waves to receive waves reflected by an object, thereby detecting a distance to the object. In the object detection device described in Patent Literature 1, a filter including a resistor and a capacitor in a power circuit is provided as a countermeasure against electrical noise.

CITATION LIST

Patent Literature

[PTL 1] JP S63-81288 A

SUMMARY OF THE INVENTION

Technical Problem

In the object detection device described in Patent Literature 1, the electrostatic capacitance of the capacitor configured to supply current to a driver circuit may be increased for improving resistance to the electrical noise. However, in the case of increasing the electrostatic capacitance of the capacitor, it takes time to charge the capacitor. At this point, in the case of employing power superimposition communication standards for connection between an ECU and a sensor, current exceeding a communicable current upper limit set according to the communication standards is applied during charging of the capacitor. For this reason, communication between the ECU and the sensor is not available. As a result, a longer time is required until communication between the ECU and the sensor is resumed.

An object of the present disclosure is to provide an object detection technique capable of ensuring EMC performance (resistance to electrical noise and noise emission reduction performance upon driving of a driver circuit) and shortening a time until communication with a control device is resumed.

Solution to Problem

An object detection device as one aspect of the technique of the present disclosure is applied to an object detection system configured such that connection to a control device is made via a communication line to perform power supply via the communication line and a signal is superimposed on current flowing through the communication line to transfer information. The object detection device is configured to drive a piezoelectric vibrator in a predetermined control period and transmit a survey wave, and receive a wave reflected by an object. The object detection device includes a capacitor connected in parallel with a driver circuit configured to drive the piezoelectric vibrator, and a current control unit configured to control the current of the communication line after the end of supplying power to the driver circuit.

In the object detection device with the above-described configuration, the current control unit controls the current value, and therefore, communication with the control device can be promptly resumed after the end of supplying power to the driver circuit. In the object detection device with the above-described configuration, a time until resuming communication can be shortened, and therefore, a capacitor having a larger electrostatic capacitance and requiring time for charging can be employed. With this configuration, resistance to electrical noise is improved.

DESCRIPTION OF EMBODIMENTS

Hereinafter, each embodiment will be described with reference to the drawings. Note that in each embodiment described below, the same reference numerals are used to represent the same or equivalent elements in the figures. Description of the elements indicated by the same reference numerals is incorporated herein.

First Embodiment

An object detection device according to the present embodiment is, e.g., an ultrasonic sensor, and is mounted on a movable body such as a vehicle. The ultrasonic sensor is configured to transmit ultrasonic waves to the periphery of the movable body and receive waves reflected by an object present around, thereby measuring a time from transmission to reception to obtain a distance between the movable body and the object.

Figure 1:
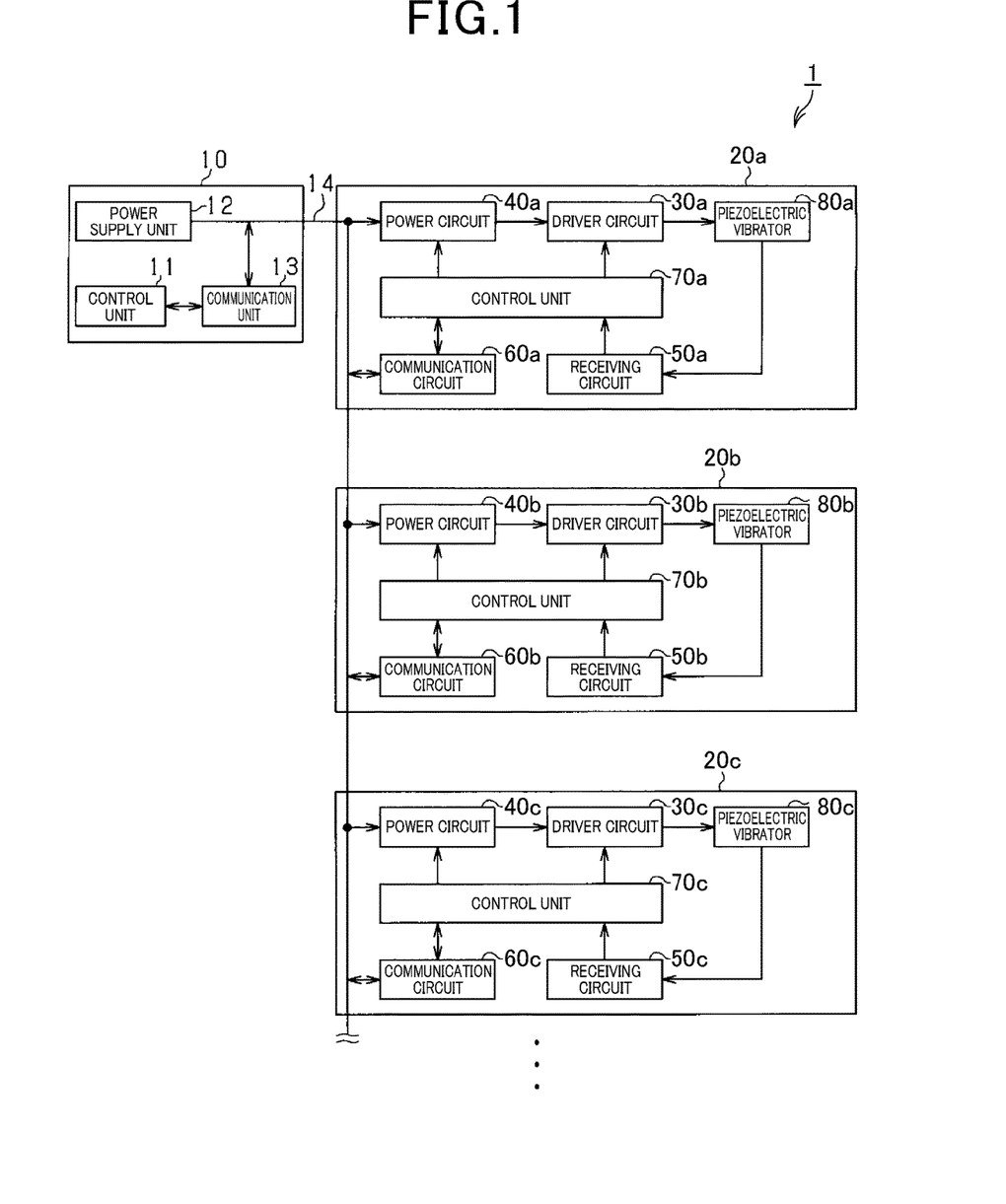
FIG. 1 is a summary configuration diagram of an object detection system in a first embodiment.

FIG. 1 is a summary configuration diagram of an object detection system 1 according to the present embodiment. The object detection system 1 includes an ECU 10 as a control device and multiple ultrasonic sensors 20a, 20b, 20c (in the case of collectively referring to these ultrasonic sensors 20a, 20b, 20c, hereinafter referred to as "ultrasonic sensors 20"). In the present embodiment, 2 to 12 ultrasonic sensors 20 as object detection devices are mounted on a single system.

The ECU 10 is a computer having, a CPU, a ROM, a RAM, an I/O, etc. The ECU 10 is configured such that the CPU executes a program stored in the ROM to implement functions. The ECU 10 includes a control unit 11, a power supply unit 12, and a communication unit 13. The control unit 11 has, e.g., the function of generating a control command etc. for the ultrasonic sensors 20, and the function of processing measurement results (detection results during a measurement period) from the ultrasonic sensors 20. The power supply unit 12 has the function of supplying, via a communication line 14, the ultrasonic sensors 20 with power supplied from the vehicle. The communication unit 13 has the function of transmitting, to the ultrasonic sensors 20, the control command input from the control unit 11, and the function of outputting, to the control unit 11, the measurement results received from the ultrasonic sensors 20. Communication among the control unit 11 and the ultrasonic sensors 20 are performed in such a manner that a signal is superimposed on current flowing through the communication line 14. Note that in description above, each function provided by the ECU 10 has been described regarding the control unit 11, the power supply unit 12, and the communication unit 13. The method for implementing these functions includes, e.g., not only a method using software, such as execution of the above-described program, but also a method using hardware such as a circuit. Thus, the control unit 11, the power supply unit 12, and the communication unit 13 are not limited to these function implementation methods.

The ultrasonic sensors 20a, 20b, 20c each include piezoelectric vibrators 80a, 80b, 80c. Note that in description below, these piezoelectric vibrators 80a, 80b, 80c will be referred to as "piezoelectric vibrators 80" in a case where the multiple piezoelectric vibrators 80a, 80b, 80c are collectively referred to. The ultrasonic sensor 20 is configured to oscillate the piezoelectric vibrator 80 to generate survey waves as ultrasonic waves, thereby receiving, by the piezoelectric vibrator 80, reflected waves generated in a case where the survey waves are reflected by the object. The ultrasonic sensors 20a, 20b, 20c each include driver circuits 30a, 30b, 30c, power circuits 40a, 40b, 40c, receiving circuits 50a, 50b, 50c, and communication circuits 60a, 60b, 60c. The driver circuits 30a, 30b, 30c (in the case of collectively referring to these driver circuits 30a, 30b, 30c, hereinafter referred to as "driver circuits 30") are each configured to drive the piezoelectric vibrators 80. The power circuits 40a, 40b, 40c (in the case of collectively referring to these power circuits 40a, 40b, 40c, hereinafter referred to as "power circuits 40") are each configured to supply power to the driver circuits 30. The receiving circuits 50a, 50b, 50c (in the case of collectively referring to these receiving circuits 50a, 50b, 50c, hereinafter referred to as "receiving circuits 50") are each configured to amplify the signals of the reflected waves received by the piezoelectric vibrators 80, thereby detecting waveform heights as voltages. The communication circuits 60a, 60b, 60c (in the case of collectively referring to these communication circuits 60a, 60b, 60c, hereinafter referred to as "communication circuits 60") are each configured to receive the control command from the ECU 10 and transmit, to the ECU 10, detection results obtained by the receiving circuits 50. The driver circuit 30, the power circuit 40, the receiving circuit 50, and the communication circuit 60 are controlled by a control unit 70a, 70b, 70c (in the case of collectively referring to these control units 70a, 70b, 70c, hereinafter referred to as "control units 70").

Figure 2:
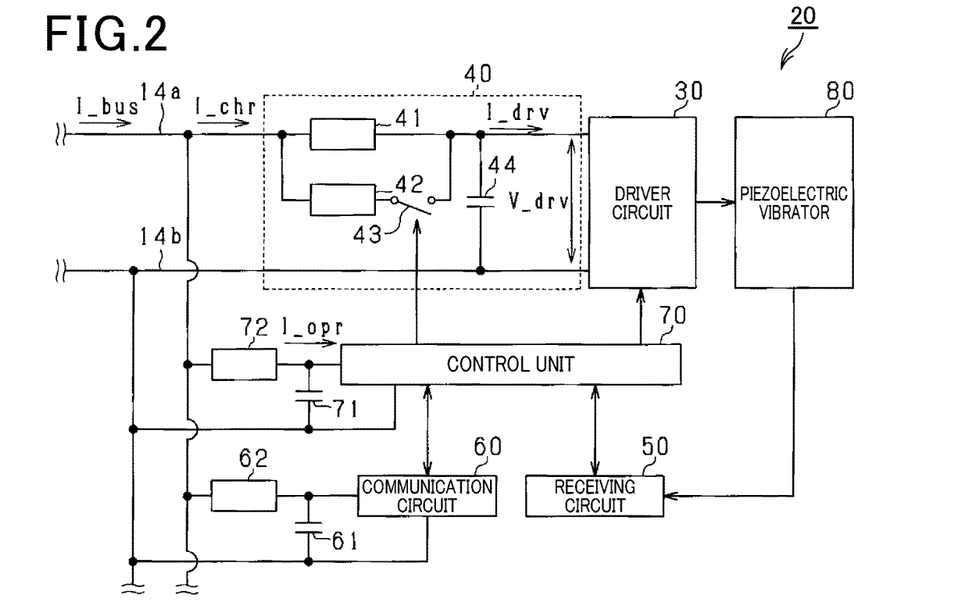
FIG. 2 is a circuit diagram of an ultrasonic sensor including a power circuit in the first embodiment.

FIG. 2 is a circuit diagram of the ultrasonic sensor 20 according to the present embodiment. Note that the ultrasonic sensors 20a, 20b, 20c have the same circuit configuration. Thus, description common to the ultrasonic sensors 20a, 20b, 20c will be given below, and description of the individual ultrasonic sensors 20a, 20b, 20c will not be given.

The power circuit 40 includes a first resistor 41 provided on a positive side line 14a of the communication line 14, and a second resistor 42 connected in parallel with the first resistor 41 via a switch 43. An open/closed state (an ON/OFF state) of the switch 43 is switched by the control command from the control unit 70. In other words, the control unit 70 transmits, to the switch 43, an open/closed switching command as the control command. A capacitor 44 is connected in parallel with the side of the power circuit 40 connected to the driver circuit 30. Specifically, one end of the capacitor 44 is connected to the positive side line 14a of the communication line 14, and the other end of the capacitor 44 is connected to a negative side line 14b of the communication line 14. A supply current I_bus indicates a current supplied from the ECU 10 to the ultrasonic sensor 20 via the communication line 14. A charge current I_chr indicates a current supplied from the ECU 10 and used for charging of the capacitor 44 and driving of the driver circuit 30. Moreover, an output current I_drv indicates a current output from the power circuit 40 to the driver circuit 30. An output voltage V_drv indicates the voltage of the capacitor 44 of the power circuit 40.

The positive side line 14a and the negative side line 14b of the communication line 14 are connected to the communication circuit 60. A resistor 62 is provided on the positive side line 14a connected to the communication circuit 60, and a capacitor 61 is provided between the negative side line 14b and the positive side line 14a connected to the communication circuit 60. That is, the resistor 62 and the capacitor 61 form a filter. Similarly, the positive side line 14a and the negative side line 14b of the communication line 14 are connected to the control unit 70. A resistor 72 is provided on the positive side line 14a, and a capacitor 71 is provided between the negative side line 14b and the positive side line 14a. The resistor 72 and the capacitor 71 form a filter.

A drive current I_opr as a current for driving the control unit 70 is input to the control unit 70 via the communication line 14. Thus, the value of the supply current I_bus is the total value of the value of the charge current I_chr and the drive current I_opr supplied to each of the ultrasonic sensors 20a, 20b, 20c. Note that for the supply current I_bus, the upper limit of an available supply current is set according to performance (supplying power performance) of the power supply unit 12 included in the ECU 10.

Figure 3:
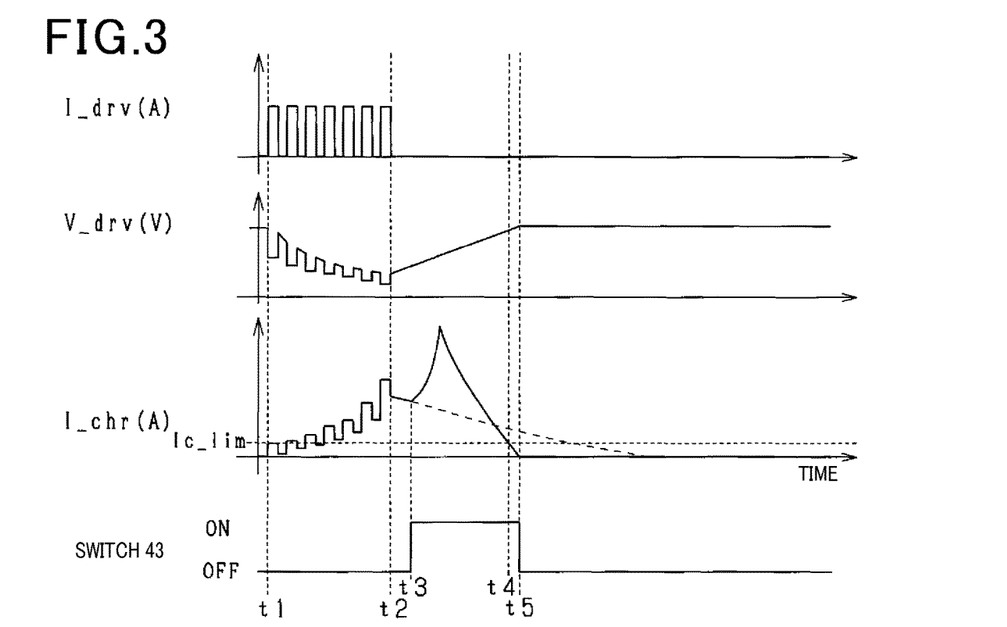
FIG. 3 is a time chart upon supplying power to a driver circuit in the first embodiment.

FIG. 3 is a time chart when power is supplied from the power circuit 40 to the driver circuit 30 in the ultrasonic sensor 20 according to the present embodiment. In FIG. 3, the upper limit of a communicable (information transfer) current between the ECU 10 and the ultrasonic sensor 20 is indicated as a communication upper limit Ic_lim for the charge current I_chr. For example, a value obtained in such a manner that a communicable current upper limit set according to communication standards is divided by the number of ultrasonic sensors 20 included in the object detection system 1 is set as the communication upper limit Ic_lim. Such setting is made for the following reasons. That is, when the value (the current value) of the charge current I_chr is equal to or less than the communication upper limit Ic_lim in each of the ultrasonic sensors 20a, 20b, 20c, the control command etc. can be transmitted from the ECU 10 to the ultrasonic sensor 20, and the measurement result etc. can be transmitted from the ultrasonic sensor 20 to the ECU 10.

At a time point t1, supplying power from the power circuit 40 to the driver circuit 30 begins to supply the output current I_drv as a pulse current. At this point, the power circuit 40 supplies power to the driver circuit 30 by means of charge accumulated in the capacitor 44. Thus, the output voltage V_drv repeatedly changes to increase/decrease in a pulse shape while an average per control period monotonically decreases. Meanwhile, the power circuit 40 needs to use, in association with a decrease in the charge accumulated in the capacitor 44, power supplied from the ECU 10 to supply power to the driver circuit 30. Thus, the charge current I_chr repeatedly changes to increase/decrease in a pulse shape while an average per control period increases.

Supplying power from the power circuit 40 to the driver circuit 30 is continued for a predetermined time set in advance, and ends at a time point t2. When power supply ends, the charge of the capacitor 44 has decreased, and therefore, supplying power from the ECU 10 to the power circuit 40 is continued. At this point, the value of the charge current I_chr is larger than the communication upper limit Ic_lim, and therefore, the ECU 10 and the ultrasonic sensor 20 cannot perform communication via the communication line 14. Thus, at a time point t3 after a lapse of the predetermined time from the time point t2 (after the end of supplying power to the driver circuit 30), the switch 43 is turned ON, and the first resistor 41 and the second resistor 42 are brought into a parallel connection state. In this manner, a combined resistance value can be decreased as compared to a case where the switch 43 is OFF. This is for ending charging of the capacitor 44 at an early point.

In FIG. 3, the charge current I_chr in a case where the switch 43 is turned ON at the time point t3 (in a case where the first resistor 41 and the second resistor 42 are connected in parallel) is indicated by a solid line. On the other hand, in FIG. 3, the charge current I_chr in a case where the switch 43 is not turned ON at the time point t3 (in a case where the first resistor 41 and the second resistor 42 are not connected in parallel) is indicated by a dashed line. As indicated by the solid line, the switch 43 is, at the time point t3, turned ON to increase the charge current I_chr, and therefore, charging of the capacitor 44 is accelerated. Then, at a time point t4, the value (the current value) of the charge current I_chr becomes equal to or less than the communication upper limit Ic_lim, and communication between the ECU 10 and the ultrasonic sensor 20 becomes available. At a time point t5 at which the value of the charge current I_chr becomes zero, the switch 43 is turned OFF. Note that in the present embodiment, the switch 43 is turned ON after a lapse of the predetermined time after the end of supplying power to the driver circuit 30, but the technique of the present disclosure is not limited to such a configuration. The timing of turning ON the switch 43 may be, for example, the time (the time point t2) of the end of supplying power to the driver circuit 30. Moreover, in the present embodiment, the switch 43 is turned OFF at the time point t5 at which the value of the charge current I_chr becomes zero, but the technique of the present disclosure is not limited to such a configuration.

After the time point t4, communication between the ECU 10 and the ultrasonic sensor 20 is available. Thus, the timing of turning OFF the switch 43 may be, for example, a timing after the time point t4.

As described above, the ultrasonic sensor 20 according to the present embodiment shortens the charging period of the capacitor 44 by means of the first resistor 41, the second resistor 42, the switch 43, and the control unit 70 configured to control the switch 43. With this configuration, attenuation of the charge current I_chr is accelerated. Thus, in the ultrasonic sensor 20 according to the present embodiment, the first resistor 41, the second resistor 42, and the switch 43 form a current control unit configured to control the current of the communication line 14 after the end of supplying power to the driver circuit 30.

Figure 4:
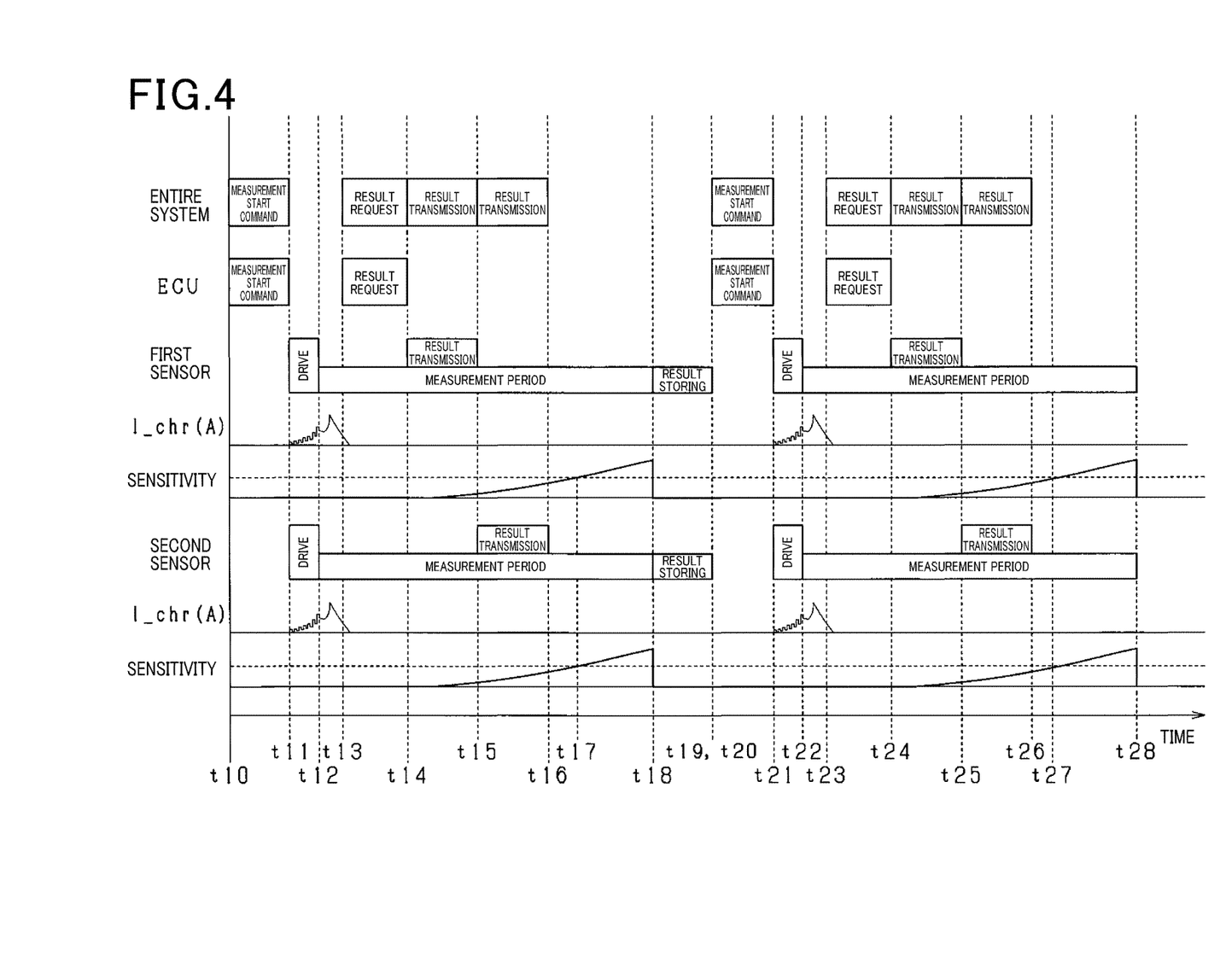
FIG. 4 is a time chart upon execution of processing of the object detection system in the first embodiment.

Next, a series of processing executed by the object detection system 1 according to the present embodiment will be described. FIG. 4 is a time chart upon execution of the processing of the object detection system 1 according to the present embodiment. Note that the control period in the time chart illustrated in FIG. 4 is several tens to several hundreds of milliseconds. At a time point t10, the ECU 10 generates the control command (a measurement start command) for starting measurement, and transmits the control command to the ultrasonic sensors 20. As a result, the ultrasonic sensors 20 start measurement according to the measurement start command. In FIG. 4, the ultrasonic sensors 20 as targets for control by the ECU 10 are illustrated as a first sensor and a second sensor for the sake of convenience in description. The ultrasonic sensors 20 as the first and second sensors receive the measurement start command, and at a time point t11, start driving of the driver circuits 30 included in these ultrasonic sensors 20 to transmit the survey waves. For a predetermined period (the measurement period) from a time point t12 at which transmission of the survey waves ends, the ultrasonic sensors 20 wait (standby for reception) until the reflected waves are received. Note that the time point t11 in FIG. 4 corresponds to the time point t1 in FIG. 3, and the time point t12 in FIG. 4 corresponds to the time point t2 in FIG. 3.

In a case where the value of the charge current I_chr is equal to or less than the communication upper limit Ic_lim at a time point t13 while the ultrasonic sensors 20 stand by for reception of the reflected waves, the ECU 10 requests (result request) transmission of the measurement results of the previous control period for the ultrasonic sensors 20. Note that the time point t13 in FIG. 4 corresponds to the time point t4 in FIG. 3. By such result request, the ultrasonic sensors 20 transmit (result transmission) the measurement results of the previous control period to the ECU 10. Note that such result transmission is controlled such that a transmission period is not overlap between the first and second sensors as the ultrasonic sensors 20. Specifically, in the present embodiment, the measurement result is transmitted from the first sensor at a time point t14, and the measurement result is transmitted from the second sensor at a time point t15 at which transmission from the first sensor ends. While the ultrasonic sensors 20 stand by for reception of the reflected waves, a reception sensitivity gradually increases in the ultrasonic sensors 20. A gradual increase in the reception sensitivity is also continued even after a time point t16 at which transmission of the measurement results has ended. Then, at a time point t17, the reception sensitivity becomes equal to or larger than a predetermined threshold, leading to a high sensitivity state. The high sensitivity state is a state in which the threshold for the wave height value (a voltage detection value indicating the waveform height) of the received reflected wave is lowered (decreased) and reception detection is available even in a case where the wave height value is small. The reasons for bringing the high sensitivity state during the standby for reception as described above are as follows. The object detected by reflection of the survey waves is at a further position with an increase in a reception standby time. In this state, the wave height values (the voltage detection values) of the survey waves and the reflected waves are attenuated according to the distance. Thus, the ultrasonic sensor 20 is configured such that the wave height value (the voltage detection value) of the received reflected waves decrease with an increase in the reception standby time. As described above, the ultrasonic sensor 20 is configured such that the reception sensitivity is set to the high sensitivity state to allow reception detection of the reflected waves greatly attenuated over time.

Meanwhile, in the high sensitivity state of the ultrasonic sensor 20, electrical noise generated upon communication might provide influence on measurement. For this reason, transmission of the measurement results is not performed after the time point t17 at which the high sensitivity state is set. Note that in the high sensitivity state, an amplification factor (a gain) for the voltage value (the voltage detection value) indicating the height of the waveform of the reflected waves detected by the piezoelectric vibrator 80 may be increased instead of lowering the threshold for the wave height value of the reflected waves. Moreover, these may be used together in the high sensitivity state.

At a time point t18 after a lapse of the measurement period, the ultrasonic sensors 20 store (result storing) the measurement results in memories of the control units 70. Specifically, in a case where the reflected waves are detected during the measurement period, the measurement result is stored in a predetermined storage region of, e.g., the memory (a storage unit) included in the control unit 70. On the other hand, in a case where no reflected waves are detected, information indicating non-detection of the reflected waves is stored as the measurement result. As described above, the object detection system 1 according to the present embodiment ends a series of processing (processing per control period) at a time point t19.

In a series of processing illustrated in FIG. 4, the period for which communication among the ECU 10 and the ultrasonic sensors 20 is not available is as follows. Specifically, such a period includes the period between the time point t11 and the time point t13 when the value of the charge current I_chr is larger than the communication upper limit Ic_lim, and the period between the time point t17 and the time point t18 when the high sensitivity state is set.

At a time point t20 after the end of storing of the measurement results, the ECU 10 transmits the measurement start command for the subsequent control period to the ultrasonic sensors 20. Note that the processing performed in the period between a time point t21 and a time point t28 as illustrated in FIG. 4 is equivalent to the processing performed between the time point t11 and the time point t18 as illustrated in FIG. 4. Moreover, in the processing of transmitting the measurement results between the time point t24 and the time point t26, the measurement results stored in the control units 70 of the ultrasonic sensors 20 are transmitted by the measurement result storing processing at the time point t18 of the previous control period.

Figure 5:
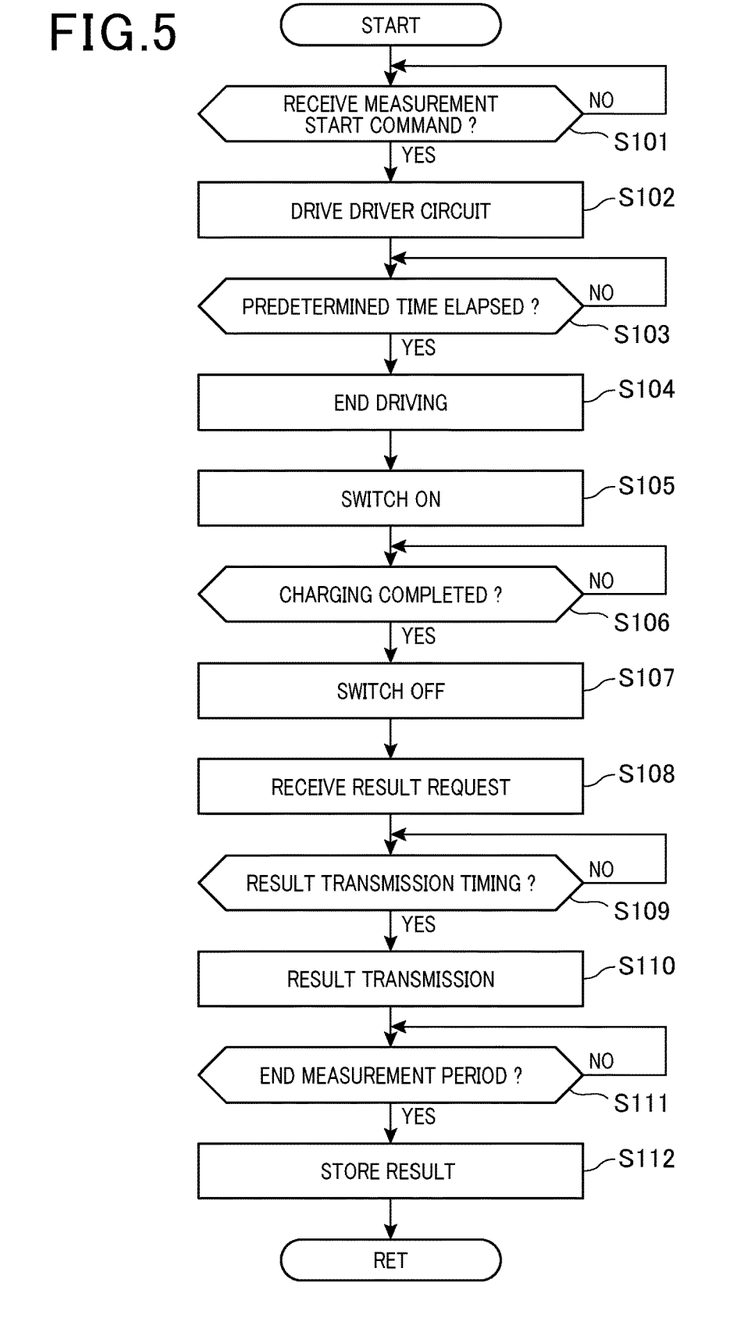
FIG. 5 is a flowchart of processing executed by a control unit of the ultrasonic sensor in the first embodiment.

Next, a series of processing executed by the control unit 70 of the ultrasonic sensor 20 in the object detection system 1 according to the present embodiment will be described. FIG. 5 is a flowchart of the processing executed by the control unit 70 of the ultrasonic sensor 20 in the present embodiment. The control unit 70 repeatedly executes the following processing according to a predetermined control period, for example. In the ultrasonic sensor 20, the control unit 70 determines whether the measurement start command has been received from the ECU 10 (step S101). As a result, in a case where the control unit 70 determines that no measurement start command has been received (step S101: NO), this processing is continued until the measurement start command is received. On the other hand, in a case where the control unit 70 determines that the measurement start command has been received (step S101: YES), driving of the driver circuit 30 begins (step S102). Subsequently, the control unit 70 determines whether a predetermined time has elapsed from the start of driving of the driver circuit 30 (step S103). As a result, in a case where the control unit 70 determines that the predetermined time has not elapsed yet (step S103: NO), driving of the driver circuit 30 is continued. On the other hand, in a case where the control unit 70 determines that the predetermined time has elapsed (step S103: YES), driving of the driver circuit 30 ends (step S104).

When driving of the driver circuit 30 ends, the control unit 70 turns ON the switch 43 as illustrated in FIG. 3 (step S105), and determines whether charging of the capacitor 44 has completed (step S106). At this point, the control unit 70 may determine on completion of charging of the capacitor 44 based on the measurement result of the charge current I_chr or based on the course of the predetermined time. As a result, in a case where the control unit 70 determines that charging of the capacitor 44 has not been completed yet (step S106: NO), the ON state of the switch 43 is continued. On the other hand, in a case where the control unit 70 determines that charging of the capacitor 44 has been completed (step S106: YES), the switch 43 is turned OFF (step S107). At this point, communication (information transfer) between the ECU 10 and the ultrasonic sensor 20 is available. Thus, the control unit 70 receives the result request of the previous control period from the ECU 10 (step S108).

The control unit 70 determines whether the required measurement result transmission timing has come (step S109). Such determination is the processing for avoiding overlap of the measurement result transmission timing among the ultrasonic sensors 20 in a case where the object detection system 1 is equipped with the multiple ultrasonic sensors 20*a*, 20*b*, 20*c*. As a result, in a case where the control unit 70 determines that the measurement result transmission timing has not come yet (step S109: NO), the control unit 70 stands by until the measurement result transmission timing. On the other hand, in a case where the control unit 70 determines that the measurement result transmission timing has come (step S109: YES), the measurement result of the previous control period is transmitted (step S110). Subsequently, the control unit 70 determines whether the measurement period has ended (step S111). As a result, in a case where the control unit 70 determines that the measurement period has not ended yet (step S111: NO), measurement (reception standby) is continued. On the other hand, in a case where the control unit 70 determines that the measurement period has ended (step S111: YES), the detection result obtained in the measurement period is stored as the measurement result in the memory (step S112), and the series of processing ends.

With the above-described configuration, the ultrasonic sensor 20 (the object detection device) according to the present embodiment provides the following advantageous effects.

In the case of using the power superimposition communication line 14, when the following conditions are satisfied, the ECU 10 and the ultrasonic sensors 20 can communicate with each other. Specifically, communication is available in a case where the current flowing through the communication line 14 among the ECU 10 and the ultrasonic sensors 20 is equal to or less than a predetermined value (the upper limit set according to the communication standards). Thus, in the ultrasonic sensor 20 according to the present embodiment, the open/closed state of the switch 43 is switched by the control unit 70, and in this manner, the first resistor 41 and the second resistor 42 are connected in parallel upon charging of the capacitor 44. With this configuration, the ultrasonic sensor 20 controls the current (the current value) flowing through the communication line 14 between the ultrasonic sensor 20 and the ECU 10, thereby shortening the period of charging the capacitor 44 from the power circuit 40. As a result, in the ultrasonic sensor 20 according to the present embodiment, the interval (the time until resuming communication) until communication with the ECU 10 becomes available can be shortened.

In the ultrasonic sensor 20 according to the present embodiment, the period of charging the capacitor 44 can be shortened, and therefore, a capacitor having a larger electrostatic capacitance and requiring time for charging can be employed. Moreover, in the ultrasonic sensor 20, a resistor with a larger resistance value can be employed as the first resistor 41. With this configuration, resistance against the electrical noise is improved in the ultrasonic sensor 20 according to the present embodiment.

Second Embodiment

Figure 6:
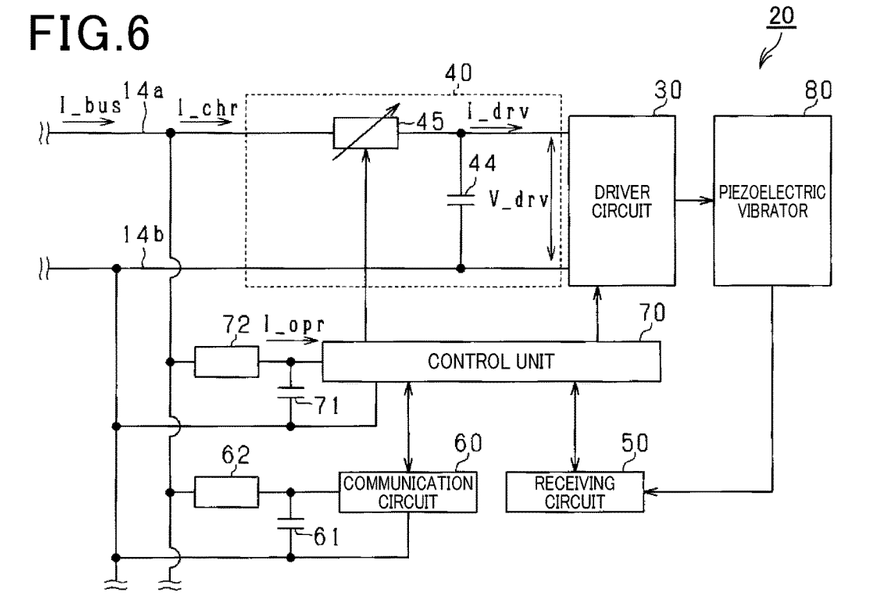
FIG. 6 is a circuit diagram of an ultrasonic sensor including a power circuit in a second embodiment.

In the present embodiment, part of a configuration of a power circuit 40 included in an ultrasonic sensor 20 is different from that of the first embodiment. FIG. 6 is a circuit diagram of the ultrasonic sensor 20 according to the present embodiment. The power circuit 40 includes a variable resistor 45 and a capacitor 44 connected in parallel with a side connected to a driver circuit 30. Other configurations are similar to those of the first embodiment. The resistance value of the variable resistor 45 is changed according to a control command from a control unit 70. In other words, the control unit 70 transmits, as the control command, a resistance value change command to the variable resistor 45. Specifically, the control unit 70 performs the control of decreasing the resistance value of the variable resistor 45 after supplying power from the power circuit 40 to the driver circuit 30. Note that other types of processing are similar to those of the first embodiment, and therefore, description thereof will not be repeated.

With the above-described configuration, the ultrasonic sensor 20 (the object detection device) according to the present embodiment provides advantageous effects equivalent to those of the first embodiment.

Third Embodiment

Figure 7:
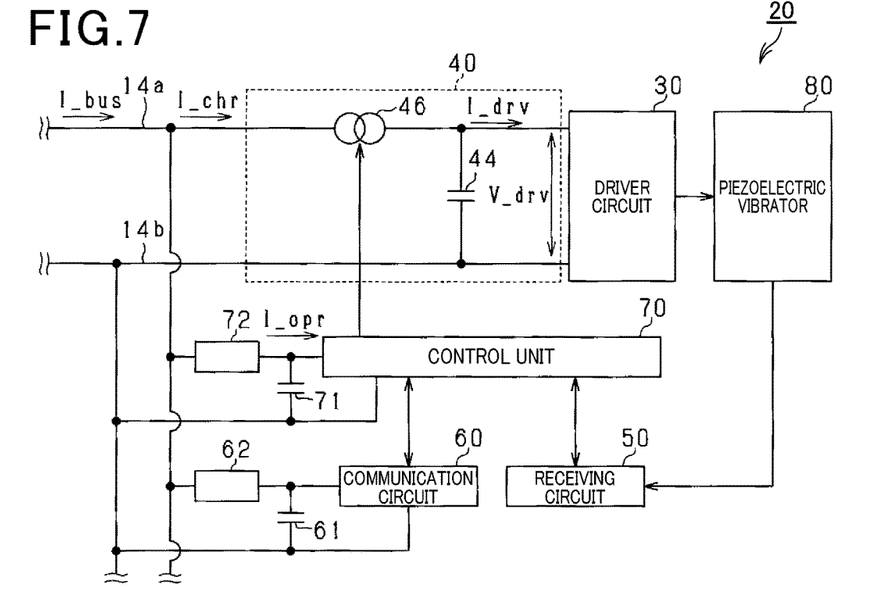
FIG. 7 is a circuit diagram of an ultrasonic sensor including a power circuit in a third embodiment.

In the present embodiment, part of a configuration of a power circuit 40 included in an ultrasonic sensor 20 is different from that of the first embodiment, and accordingly, part of processing performed by a control unit 70 is also different from that of the first embodiment. FIG. 7 is a circuit diagram of the ultrasonic sensor 20 according to the present embodiment. The power circuit 40 includes a current limiting circuit 46 configured to variably set a current upper limit. The current upper limit in the current limiting circuit 46 is set according to a control command from the control unit 70. In other words, the control unit 70 transmits, as the control command, a current upper limit setting command to the current limiting circuit 46. A capacitor 44 is connected in parallel with the side of the power circuit 40 connected to a driver circuit 30. Other configurations are similar to those of the first embodiment.

Figure 8:
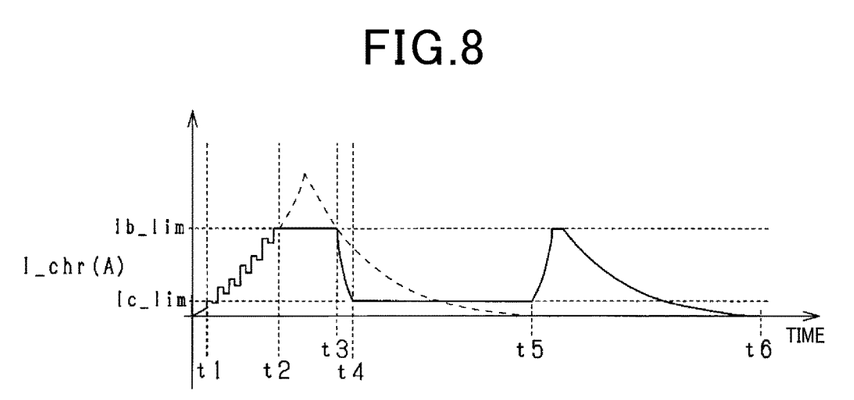
FIG. 8 is a time chart upon supplying power to a driver circuit in the third embodiment.

FIG. 8 is a time chart when power is supplied from the power circuit 40 to the driver circuit 30 in the ultrasonic sensor 20 according to the present embodiment. In FIG. 8, a charge current I_chr in the case of performing control according to the present embodiment is indicated by a solid line. On the other hand, in FIG. 8, the charge current I_chr in the case of not performing the control according to the present embodiment (the case of not providing the current limiting circuit 46) is indicated by a dashed line. As in the first embodiment, a communication upper limit Ic_lim is set for the charge current I_chr according to the present embodiment, and an upper supply limit Ib_lim is also set. For example, a value obtained in such a manner that a value based on performance (supplying power performance) of a power supply unit 12 of an ECU 10 is divided by the number of ultrasonic sensors 20 included in an object detection system 1 is set as the upper supply limit Ib_lim.

As illustrated in FIG. 8, the upper limit of the charge current I_chr in the current limiting circuit 46 is set to the communication upper limit Ic_lim upon the start of the control according to the present embodiment. At a time point t1, supplying power from the power circuit 40 to the driver circuit 30 begins, and the upper limit of the charge current I_chr is set to the upper supply limit Ib_lim for increasing the charge current I_chr. At this point, in the power circuit 40, a charge accumulated in a capacitor 44 decreases over time, and the charge current I_chr increases. Then, the value of the charge current I_chr reaches the upper supply limit Ib_lim at a time point t2. Thereafter, in the power circuit 40, supplying power according to the upper supply limit Ib_lim is continued until a time point t3 at which the power supply to the driver circuit 30 ends.

At the time point t3, the power supply to the driver circuit 30 ends, and the upper limit of the charge current I_chr in the current limiting circuit 46 is set to the communication upper limit Ic_lim. At this point, the value of the charge current I_chr becomes the communication upper limit Ic_lim at a time point t4 at which a predetermined time has elapsed from the time point t3. Thus, after the time point t4, the value of the charge current I_chr reaches the communication upper limit Ic_lim, and communication between the ECU 10 and the ultrasonic sensor 20 becomes available. Note that at the time point t4, charging of the capacitor 44 has not been completed yet. Thus, after the time point t4, the state in which the upper limit of the charge current I_chr is the communication upper limit Ic_lim is continued.

In a case where the control of limiting the charge current I_chr after supplying power to the driver circuit 30 is performed using the current limiting circuit 46 as described above, charging of the capacitor 44 is, in some cases, not completed during a control period depending on the setting of the communication upper limit Ic_lim. For this reason, the period of charging the capacitor 44 needs to be provided for control of the power circuit 40. This period is set in advance as the period (the period of storing a measurement result in a memory) of not performing communication between the ECU 10 and the ultrasonic sensor 20. Thus, at a time point t5 according to the present embodiment, the upper limit of the charge current I_chr is set to the upper supply limit Ib_lim. After the charge current I_chr has gradually increased, the charge current I_chr gradually decreases with charging of the capacitor 44. When charging is completed at a time point t6, the value of the charge current I_chr becomes zero.

Figure 9:
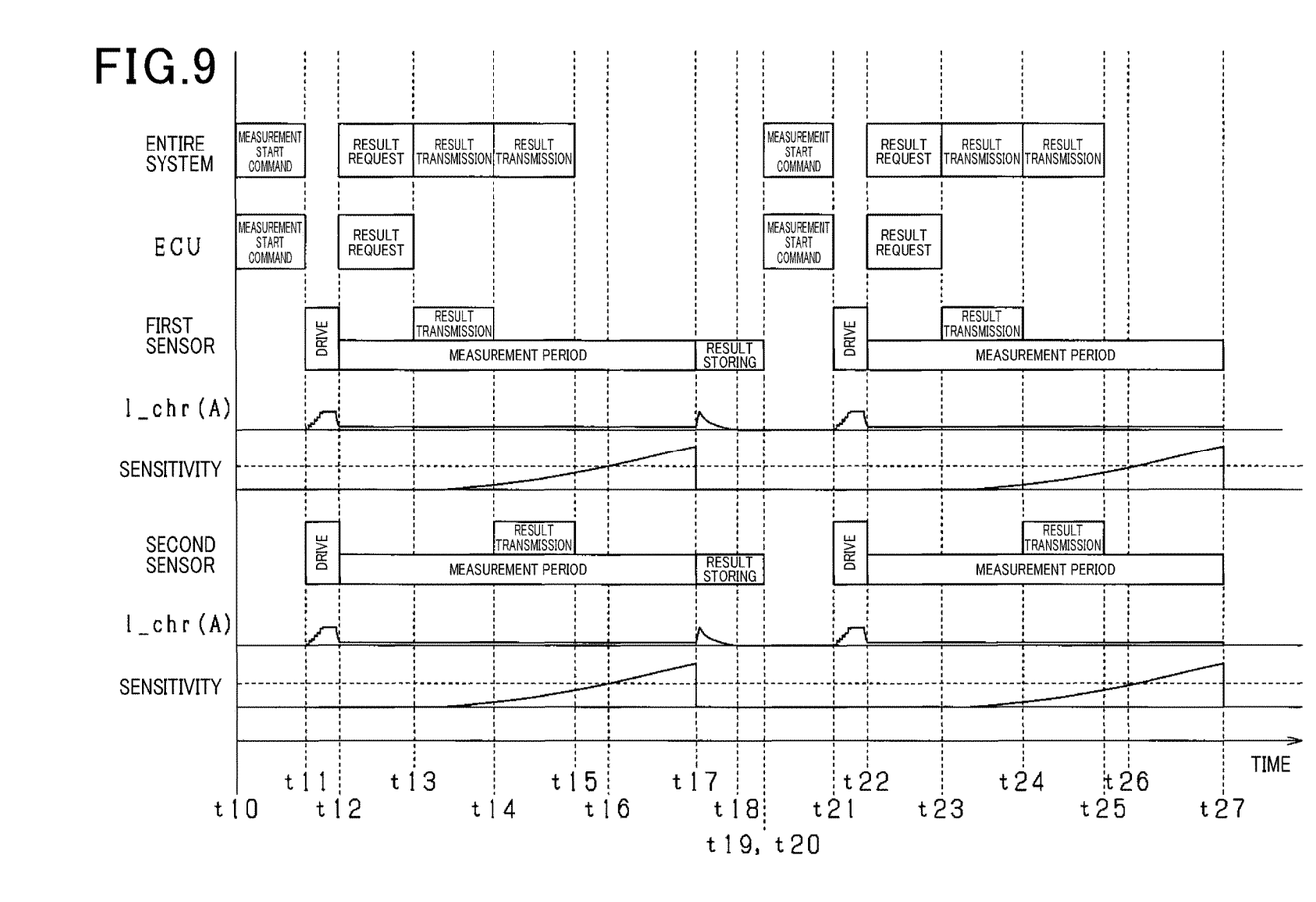
FIG. 9 is a time chart upon execution of processing of an object detection system in the third embodiment.

Subsequently, processing executed by the object detection system 1 according to the present embodiment will be described. FIG. 9 is a time chart upon execution of the processing of the object detection system 1 according to the present embodiment. Note that the control period in the time chart illustrated in FIG. 9 is several tens to several hundreds of milliseconds as in the first embodiment. At a time point t10, the ECU 10 generates a measurement start command, and transmits the measurement start command to the ultrasonic sensors 20. As a result, the ultrasonic sensors 20 start measurement according to the measurement start command. In FIG. 9, the ultrasonic sensors 20 as targets for control by the ECU 10 are, as in the first embodiment, illustrated as a first sensor and a second sensor for the sake of convenience of description. The ultrasonic sensors 20 as the first and second sensors receive the measurement start command, and at a time point t11, start driving of the driver circuits 30 included in the ultrasonic sensors 20 to transmit survey waves. At this point, the upper limit of the charge current I_chr is set to the upper supply limit Ib_lim. At a time point t12 at which transmission of the survey waves ends, the upper limit of the charge current I_chr is set to the communication upper limit Ic_lim. The ultrasonic sensors 20 stand by for reception of reflected waves after the time point t12 at which transmission of the survey waves ends, and the ECU 10 requests (result request) transmission of measurement results of the previous control period for the ultrasonic sensors 20. Note that the time point t11 in FIG. 9 corresponds to the time point t1 in FIG. 3, and the time point t12 in FIG. 9 corresponds to the time point t4 in FIG. 3.

By the result request from the ECU 10, transmission of the measurement result from the first sensor is performed at a time point t13, and transmission of the measurement result from the second sensor is performed at a time point t14 at which transmission from the first sensor ends. When transmission of the measurement results is performed, a reception sensitivity gradually increases in the ultrasonic sensors 20. A gradual increase in the reception sensitivity is also continued after a time point t15 at which transmission of the measurement results ends. Then, at a time point t16, the reception sensitivity becomes equal to or larger than a predetermined threshold, leading to a high sensitivity state.

At a time point t17 after a lapse of a measurement period, the ultrasonic sensors 20 store (result storing) the measurement results in the memories of the control units 70. In the period of storing the measurement results, communication among the ECU 10 and the ultrasonic sensors 20 is not performed. Thus, at a time point t17, the upper limit of the charge current I_chr is set to the upper supply limit Ib_lim, and the capacitor 44 is charged. The period of storing the measurement results is set in advance to such a length that charging of the capacitor 44 is sufficiently completed. Thus, at a time point t18 during this period, charging of the capacitor 44 is completed, and the value of the charge current I_chr becomes zero. As described above, the object detection system 1 according to the present embodiment ends a series of control (processing per control period) at a time point t19.

At a time point t20 after the end of storing of the measurement results, the ECU 10 transmits the measurement start command for the subsequent control period to the ultrasonic sensors 20. Note that the processing performed in the period between the time point t21 and the time point t27 as illustrated in FIG. 9 is equivalent to the processing performed between the time point t11 and the time point t17 as illustrated in FIG. 9.

In a series of processing illustrated in FIG. 9, the period for which communication among the ECU 10 and the ultrasonic sensors 20 is not available is as follows. Specifically, this period includes the period between the time point t11 and the time point t12 when the value of the charge current I_chr is larger than the communication upper limit Ic_lim, the period between the time point t16 and the time point t17 when the high sensitivity state is set, and the period between the time point t17 and the time point t18 when the capacitor 44 is charged.

Figure 10:
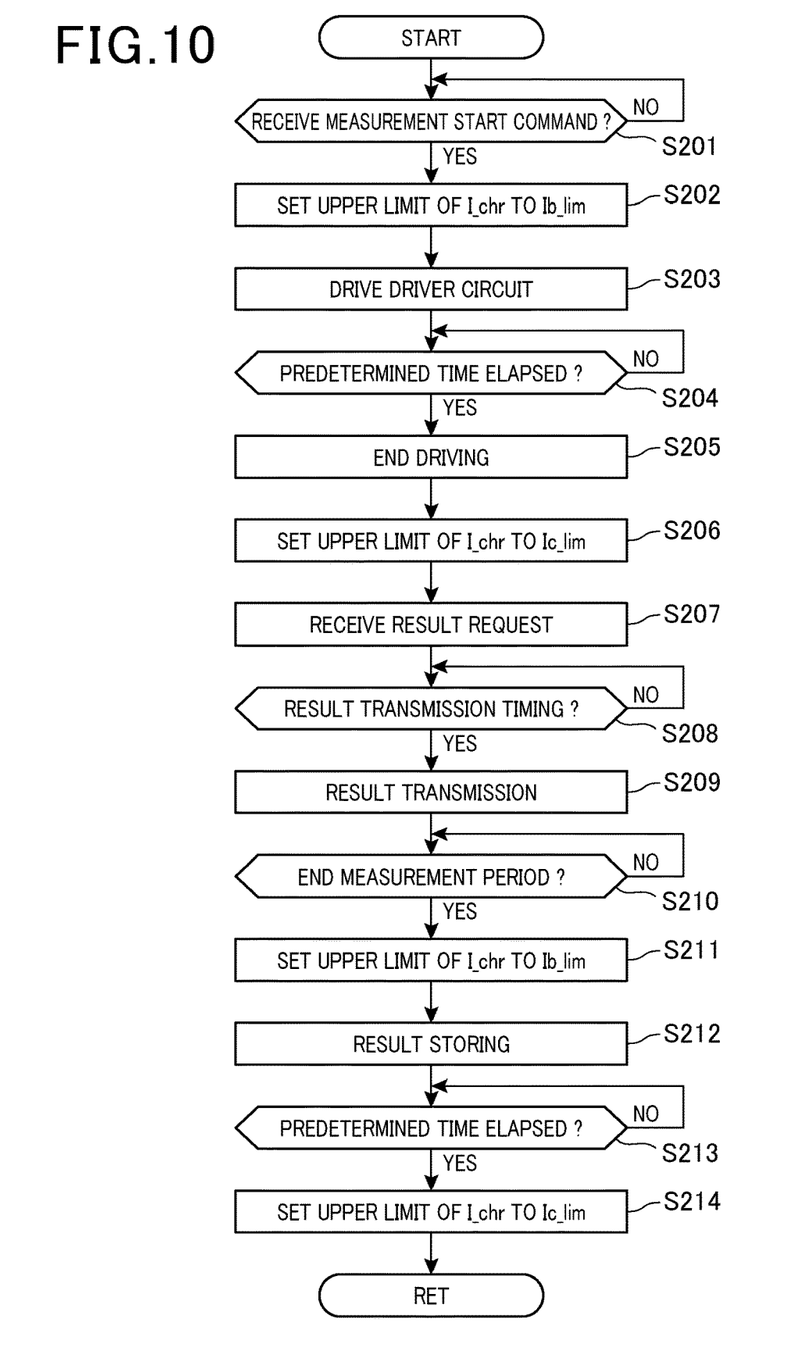
FIG. 10 is a flowchart of processing executed by a control unit of the ultrasonic sensor in the third embodiment.

Next, a series of processing executed by the control unit 70 of the ultrasonic sensor 20 in the object detection system 1 according to the present embodiment will be described. FIG. 10 is a flowchart of the processing executed by the control unit 70 of the ultrasonic sensor 20 in the present embodiment. The control unit 70 repeatedly executes the following processing according to a predetermined control period, for example. In the ultrasonic sensor 20, the control unit 70 determines whether the measurement start command has been received from the ECU 10 (step S201). As a result, in a case where the control unit 70 determines that no measurement start command has been received (step S201: NO), this processing is continued until the measurement start command is received. On the other hand, in a case where the control unit 70 determines that the measurement start command has been received (step S201: YES), the upper limit of the charge current I_chr is set to the upper supply limit Ib_lim (step S202). Then, driving of the driver circuit 30 begins (step S203). Subsequently, the control unit 70 determines whether a predetermined time has elapsed from the start of driving of the driver circuit 30 (step S204). As a result, in a case where the control unit 70 determines that the predetermined time has not elapsed yet (step S204: NO), driving of the driver circuit 30 is continued. On the other hand, in a case where the control unit 70 determines that the predetermined time has elapsed (step S204: YES), driving of the driver circuit 30 ends (step S205). Then, the upper limit of the charge current I_chr is set to the communication upper limit Ic_lim (step S206).

When the upper limit of the charge current I_chr is the communication upper limit Ic_lim, communication (information transfer) between the ECU 10 and the ultrasonic sensor 20 is available. Thus, the control unit 70 receives the result request of the previous control period from the ECU 10 (step S207). Subsequently, the control unit 70 determines whether the required measurement result transmission timing has come (step S208). As a result, in a case where the control unit 70 determines that the measurement result transmission timing has not come yet (step S208: NO), the control unit 70 stands by until the measurement result transmission timing. On the other hand, in a case where the control unit 70 determines that the measurement result transmission timing has come (step S208: YES), the measurement result of the previous control period is transmitted (step S209). Subsequently, the control unit 70 determines whether the measurement period has ended (step S210). As a result, in a case where the control unit 70 determines that the measurement period has not ended yet (step S210: NO), measurement (reception standby) is continued.

On the other hand, in a case where the control unit 70 determines that the measurement period has ended (step S210: YES), the upper limit of the charge current I_chr is set to the upper supply limit Ib_lim (step S211). Then, the capacitor 44 is charged while a detection result obtained during the measurement period is stored as the measurement result in the memory (step S212). Subsequently, the control unit 70 determines whether a predetermined time has elapsed after the end of the measurement period (step S213). This predetermined time is set in advance to such a length that charging of the capacitor 44 is sufficiently completed. As a result, in a case where the control unit 70 determines that the predetermined time has not elapsed yet (step S213: NO), there is a probability that charging of the capacitor 44 has not completed yet, and therefore, the standby is continued. On the other hand, in a case where the control unit 70 determines that the predetermined time has elapsed (step S213: YES), the upper limit of the charge current I_chr is set to the communication upper limit Ic_lim, and a series of processing ends.

With the above-described configuration, the ultrasonic sensor 20 (an object detection device) according to the present embodiment provides the following advantageous effects in addition to advantageous effects equivalent to those of the first embodiment.

In the ultrasonic sensor 20 according to the present embodiment, the current limiting circuit 46 decreases the current value of the charge current I_chr to the communication upper limit Ic_lim after supplying power from the power circuit 40 to the driver circuit 30. Thus, in the ultrasonic sensor 20 according to the present embodiment, communication between the ECU 10 and the ultrasonic sensor 20 can be performed without the need for wait for charging of the capacitor 44.

In the ultrasonic sensor 20, the period of storing the measurement result in the memory included in the control unit 70 needs to be provided after the end of the measurement period. In this period, communication between the ECU 10 and the ultrasonic sensor 20 is not performed. In the ultrasonic sensor 20 according to the present embodiment, the period of not performing communication is utilized to charge the capacitor 44. Thus, in the ultrasonic sensor 20, the length of the control period can be shortened. This allows detection of an object at a short interval in the ultrasonic sensor 20 according to the present embodiment, and therefore, object detection accuracy is improved.

Fourth Embodiment

Figure 11:
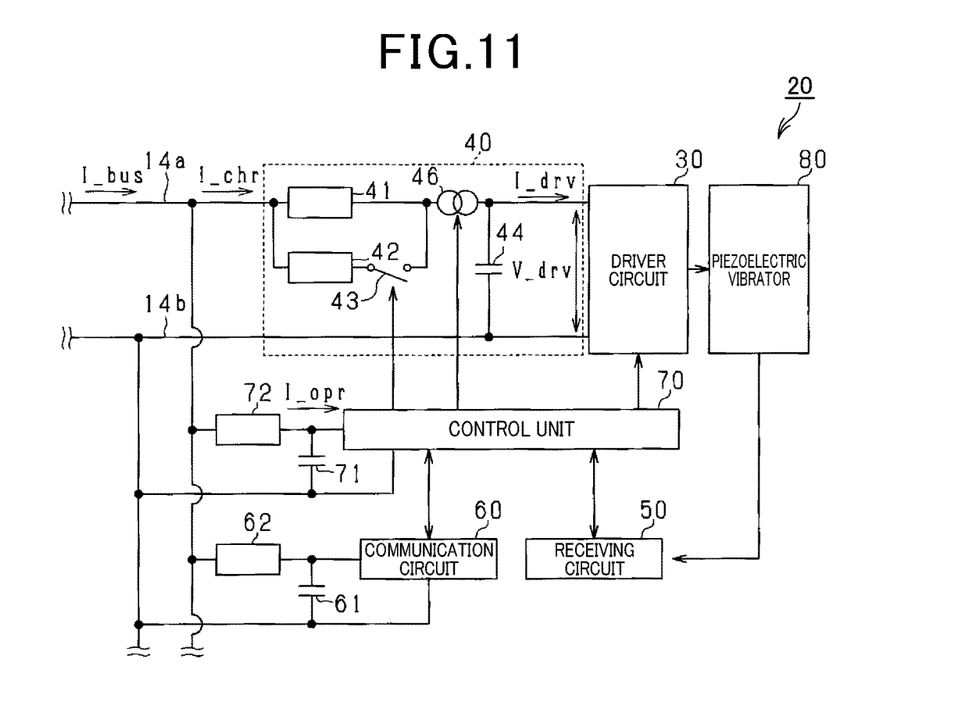
FIG. 11 is a circuit diagram of an ultrasonic sensor including a power circuit in a fourth embodiment.

In the present embodiment, part of a configuration of a power circuit 40 included in an ultrasonic sensor 20 is different from that of the third embodiment, and accordingly, part of processing performed by a control unit 70 is also different from that of the third embodiment. FIG. 11 is a circuit diagram of the ultrasonic sensor 20 according to the present embodiment. The power circuit 40 includes a first resistor 41 provided on a positive side line 14a of a communication line 14, and a second resistor 42 connected in parallel with the first resistor 41 via a switch 43. That is, a serial connection body of the second resistor 42 and the switch 43 is connected in parallel with the first resistor 41. Moreover, the power circuit 40 includes a current limiting circuit 46 configured to variably set a current upper limit, and the first resistor 41 is connected in series with the current limiting circuit 46. The current upper limit in the current limiting circuit 46 is set by a control command from the control unit 70. An open/closed state of the switch 43 is switched according to the control command from the control unit 70. Specifically, the switch 43 is turned ON such that the first resistor 41 and the second resistor 42 are brought into a parallel connection state. Moreover, a capacitor 44 is connected in parallel with the side of the power circuit 40 connected to a driver circuit 30.

Figure 12:
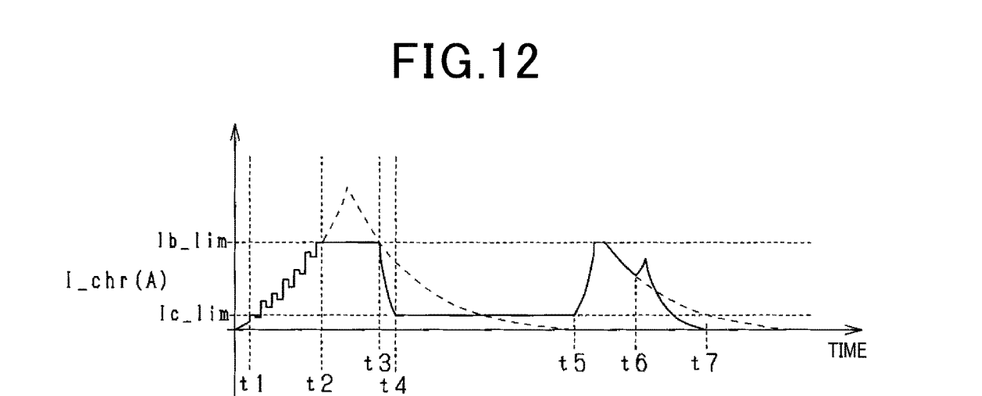
FIG. 12 is a time chart upon supplying power to a driver circuit in the fourth embodiment.

FIG. 12 is a time chart when power is supplied from the power circuit 40 to the driver circuit 30 in the ultrasonic sensor 20 according to the present embodiment. In FIG. 12, a charge current I_chr in the case of performing control according to the present embodiment is indicated by a solid line. On the other hand, in FIG. 12, a charge current I_chr in the case of not performing the control according to the present embodiment is indicated by a dashed line. As illustrated in FIG. 12, the upper limit of the charge current I_chr in the current limiting circuit 46 is set to a communication upper limit Ic_lim upon the start of the control according to the present embodiment. At a time point t1, supplying power from the power circuit 40 to the driver circuit 30 begins, and the upper limit of the charge current I_chr is set to an upper supply limit Ib_lim for increasing the charge current I_chr. At this point, in the power circuit 40, a charge accumulated in the capacitor 44 decreases over time, and the charge current I_chr increases. The value of the charge current I_chr at a time point t2 reaches the upper supply limit Ib_lim. Subsequently, in the power circuit 40, the power supply is continued according to the upper supply limit Ib_lim until a time point t3 at which the power supply to the driver circuit 30 ends.

At the time point t3, the power supply to the driver circuit 30 ends, and the upper limit of the charge current I_chr in the current limiting circuit 46 is set to the communication upper limit Ic_lim. At this point, the value of the charge current I_chr becomes the communication upper limit Ic_lim at a time point t4 at which a predetermined time has elapsed from the time point t3. Thus, after the time point t4, the value of the charge current I_chr becomes the communication upper limit Ic_lim, and communication between the ECU 10 and the ultrasonic sensor 20 is available. Note that at the time point t4, charging of the capacitor 44 is not completed yet. Thus, after the time point t4, the state in which the upper limit of the charge current I_chr is the communication upper limit Ic_lim is continued.

In a case where the control of limiting the charge current I_chr after supplying power to the driver circuit 30 is performed using the current limiting circuit 46 as described above, charging of the capacitor 44 is, in some cases, not completed during a control period depending on the setting of the communication upper limit Ic_lim. For this reason, the period of charging the capacitor 44 needs to be provided for control of the power circuit 40. This period is, as in the third embodiment, the period (the period of not performing communication between the ECU 10 and the ultrasonic sensor 20) of storing a measurement result in a memory. Thus, at a time point t5 according to the present embodiment, the upper limit of the charge current I_chr is set to the upper supply limit Ib_lim. After the charge current I_chr has gradually increased, the charge current I_chr gradually decreases with charging of the capacitor 44. At a time point t6, the switch 43 is turned ON, and the first resistor 41 and the second resistor 42 are brought into a parallel connection state. In this manner, the speed of charging the capacitor 44 is accelerated. This advances the time at which the value of the charge current I_chr becomes equal to or less than the communication upper limit Ic_lim. That is, this allows the charge current I_chr to reach the communication upper limit Ic_lim earlier. Then, when charging is completed at a time point t7, the charge current I_chr becomes zero.

Note that in the power circuit 40, a variable resistor may be provided as in the second embodiment instead of connecting the serial connection body of the second resistor 42 and the switch 43 in parallel with the first resistor 41.

With the above-described configuration, the ultrasonic sensor 20 (an object detection device) according to the present embodiment provides the following advantageous effects in addition to advantageous effects equivalent to those of the third embodiment.

In the ultrasonic sensor 20 according to the present embodiment, the switch 43 is, in the period of charging the capacitor 44, turned ON during attenuation of the charge current I_chr, and the charging period is shortened. This can shorten the period of not allowing communication with the ECU 10 in the control period in the ultrasonic sensor 20 according to the present embodiment.

<Variations>

In the above-described embodiments, it is configured such that the object detection system 1 includes the ECU 10 (the control device) and the multiple ultrasonic sensors 20a, 20b, 20c (the object detection devices), but the technique of the present disclosure is not limited to this configuration. Other configurations may include, for example, a configuration in which the object detection system 1 includes the ECU 10 and the single ultrasonic sensor 20.

In the above-described first and third embodiments, the common period of charging the capacitor 44 is applied to the multiple ultrasonic sensors 20a, 20b, 20c included in the object detection system 1, but the technique of the present disclosure is not limited to this configuration. Different periods of charging the capacitor 44 may be applied. Moreover, in the above-described first and third embodiments, the same reception sensitivity is applied to the multiple ultrasonic sensors 20a, 20b, 20c, but the technique of the present disclosure is not limited to this configuration. Different reception sensitivities may be applied.

In the above-described first and third embodiments, it is configured such that the measurement results of the previous control period are transmitted to the ECU 10 while the ultrasonic sensors 20 stand by for reception of the reflected waves, but the technique of the present disclosure is not limited to this configuration. Other configurations may include, for example, a configuration in which the measurement results are transmitted to the ECU 10 after the end of a reception standby period. In this case, the measurement results to be transmitted may be the results of the previous control period, but may be results obtained in the current control period.

In the above-described embodiments, it is configured such that the upper supply limit Ib_lim and the communication upper limit Ic_lim are provided for the charge current I_chr for each of the ultrasonic sensors 20, 20a, 20b, but the technique of the present disclosure is not limited to this configuration. Other configurations include, for example, a configuration in which the upper supply limit Ib_lim and the communication upper limit Ic_lim are provided for the supply current I_bus as the total value of the value of the charge current I_chr and the value of the drive current I_opr in each of the ultrasonic sensors 20, 20a, 20b. In this case, the value of the charge current I_chr and the value of the drive current I_opr may be monitored, and control may be made such that the total value of these values does not exceed the upper supply limit Ib_lim or the communication upper limit Ic_lim.

In the above-described third and fourth embodiments, it is configured such that the upper supply limit Ib_lim is provided for the charge current I_chr, but the technique of the present disclosure is not limited to this configuration. The upper supply limit Ib_lim is not necessarily provided for the charge current I_chr.

In the above-described first embodiment, it is configured such that the charge current I_chr is, after supplying power to the driver circuit 30, increased by a decrease in the resistance value and the period of charging the capacitor 44 is shortened, but the technique of the present disclosure is not limited to this configuration. Other configurations include, for example, a configuration in which the resistance value is, after supplying power to the driver circuit 30, increased such that the value of the charge current I_chr becomes equal to or less than the communication upper limit Ic_lim as in the above-described third and fourth embodiments. In this case, the period of decreasing the resistance value to charge the capacitor 44 may be provided after the end of communication between the ECU 10 and the ultrasonic sensor 20.

In the above-described embodiments, application to the system configured to measure the distance to the object by the ultrasonic sensors 20 has been described, but the technique of the present disclosure is not limited to this configuration. The techniques described in the above-described embodiments may be applied to a system configured to detect the presence of an object within a predetermined distance, for example.

In the above-described embodiments, the configuration in which the object detection system 1 including the ultrasonic sensors 20 is mounted on the movable body such as the vehicle has been described, but the technique of the present disclosure is not limited to this configuration. The target on which the object detection system 1 according to the above-described embodiments is mounted is not limited to the movable body. The object detection system 1 may be mounted on a stationary object etc. to detect a distance to an object present around the stationary object, for example.

REFERENCE SIGNS LIST

10 . . . ECU, 14 . . . Communication line, 20 . . . Ultrasonic sensor, 30 . . . Driver circuit, 41 . . . First resistor, 42 . . . Second resistor, 44 . . . Capacitor, 45 . . . Variable resistor, 46 . . . Current limiting circuit.

The invention claimed is:

1. An object detection device applied to an object detection system configured such that a control device and the object detection device are connected together via a communication line to perform power supply via the communication line and a signal is superimposed on current flowing through the communication line to transfer information and
the object detection device being configured to drive a piezoelectric vibrator in a predetermined control period and transmit a survey wave to receive a wave reflected by an object, the object detection device comprising:
a capacitor connected in parallel with a driver circuit configured to drive the piezoelectric vibrator; and
a current control unit configured to control a current of the communication line after an end of supplying power to the driver circuit from the control device, wherein:
a communication upper limit as a value allowing information transfer between the object detection device and the control device is set for the current of the communication line;
the object detection device waits, after transmission of the survey wave, for reception of the reflected wave for a predetermined period; and the current control unit sets the current of the communication line equal to or less than the communication upper limit after the end of supplying power to the driver circuit, and provides a charging period as a period of setting the current on the communication line to be larger than the communication upper limit after a lapse of the predetermined period and before a subsequent control period.

2. The object detection device according to claim 1, wherein
the information transfer is performed between the object detection device and the control device in the predetermined period.

3. The object detection device according to claim 1, wherein:
the control device includes a power supply unit configured to supply power to the object detection device via the communication line;
an upper supply limit is set as an available supply power limit for the power supply unit; and
the current control unit sets the current value of the communication line to equal to or less than the upper supply limit.

4. The object detection device according to claim 1, wherein
the current control unit includes a resistor whose resistance value is variable.

5. The object detection device according to claim 1, wherein
the current control unit includes a current limiting circuit configured to variably set the current value of the communication line.

6. The object detection device according to claim 5, wherein
the current control unit further includes a resistor which is connected in series with the current limiting circuit and whose resistance value is variable.

7. An object detection system comprising:
one or more object detection devices according to claim 1;
the control device; and
the communication line communicably connecting among the control device and the object detection devices, wherein
the information obtained in the object detection device is transmitted to the control device via the communication line after supplying power to the driver circuit and before the subsequent control period.

8. An object detection device applied to an object detection system configured such that a control device and the object detection device are connected together via a communication line to perform power supply via the communication line and a signal is superimposed on current flowing through the communication line to transfer information and
the object detection device being configured to drive a piezoelectric vibrator in a predetermined control period and transmit a survey wave to receive a wave reflected by an object, the object detection device comprising:
a capacitor connected in parallel with a driver circuit configured to drive the piezoelectric vibrator; and
a current control unit configured to control a current of the communication line after an end of supplying power to the driver circuit from the control device, wherein:
a communication upper limit as a value allowing information transfer between the object detection device and the control device is set for the current of the communication line; and
the current control unit increases the current of the communication line to be higher than the communication upper limit after the end of supplying power to the driver circuit.

* * * * *